United States Patent
Moriya (10) Patent No.: US 7,937,178 B2
(45) Date of Patent: May 3, 2011

(54) CHARGING METHOD FOR SEMICONDUCTOR DEVICE MANUFACTURING APPARATUS, STORAGE MEDIUM STORING PROGRAM FOR IMPLEMENTING THE CHARGING METHOD, AND SEMICONDUCTOR DEVICE MANUFACTURING APPARATUS IMPLEMENTING THE CHARGING METHOD

(75) Inventor: Tsuyoshi Moriya, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 217 days.

(21) Appl. No.: 11/843,400

(22) Filed: Aug. 22, 2007

(65) Prior Publication Data
US 2008/0052251 A1 Feb. 28, 2008

Related U.S. Application Data

(60) Provisional application No. 60/842,670, filed on Sep. 7, 2006.

(30) Foreign Application Priority Data

Aug. 28, 2006 (JP) .................................. 2006-230487

(51) Int. Cl.
*G06F 19/00* (2011.01)
*G06F 11/00* (2006.01)
*G06F 17/00* (2006.01)
*G01N 37/00* (2006.01)

(52) U.S. Cl. .......... 700/108; 700/121; 702/81; 702/188; 705/400

(58) Field of Classification Search ............ 700/95, 700/96, 108–110, 121, 174, 232; 702/81, 702/82, 84, 182, 188; 705/1, 8, 400, 500; 438/14–17
See application file for complete search history.

(56) References Cited

U.S. PATENT DOCUMENTS

| | | | | |
|---|---|---|---|---|
| 6,066,179 | A * | 5/2000 | Allan | 716/4 |
| 6,751,514 | B2 * | 6/2004 | Ando | 700/109 |
| 6,801,823 | B2 * | 10/2004 | Mori | 700/117 |
| 7,131,890 | B1 * | 11/2006 | Molnar | 451/8 |
| 2004/0021856 | A1 * | 2/2004 | Nishiyama et al. | 356/237.2 |
| 2005/0154482 | A1 * | 7/2005 | Tomoyasu | 700/108 |
| 2008/0008842 | A1 * | 1/2008 | Soo et al. | 427/569 |
| 2008/0318429 | A1 * | 12/2008 | Ozawa et al. | 438/695 |

FOREIGN PATENT DOCUMENTS

JP 2002-117336 4/2002

* cited by examiner

*Primary Examiner* — Sean P Shechtman
(74) *Attorney, Agent, or Firm* — Oblon, Spivak, McClelland, Maier & Neustadt, L.L.P.

(57) ABSTRACT

A charging method for a semiconductor device manufacturing apparatus, which can appropriately and promptly distribute profits between a customer and a manufacturer according to the yield of semiconductor devices. An indicator related to the yield of the semiconductor devices is measured, and a fee is charged for the usage of the semiconductor device manufacturing apparatus according to the measured indicator.

10 Claims, 5 Drawing Sheets

CHARGING METHOD FOR SEMICONDUCTOR DEVICE MANUFACTURING APPARATUS, STORAGE MEDIUM STORING PROGRAM FOR IMPLEMENTING THE CHARGING METHOD, AND SEMICONDUCTOR DEVICE MANUFACTURING APPARATUS IMPLEMENTING THE CHARGING METHOD

BACKGROUND OF THE INVENTION

1. Field of the Invention

The present invention relates to a charging method for a semiconductor device manufacturing apparatus, a storage medium storing a program for implementing the charging method, and a semiconductor device manufacturing apparatus implementing the charging method. In particular, the present invention relates to a method of charging for the usage of a semiconductor device manufacturing apparatus.

2. Description of the Related Art

In the sale of a semiconductor device manufacturing apparatus that subjects wafers as substrates to plasma processing and manufactures semiconductor devices from the wafers, a customer pays a manufacturer for the semiconductor device manufacturing apparatus after the semiconductor device manufacturing apparatus has been delivered from the manufacturer to the customer and has passed a receiving inspection carried out by the customer. Even if the apparatus life of the semiconductor device manufacturing apparatus is shorter than expected after the customer starts using the semiconductor device manufacturing apparatus, the price of the semiconductor device manufacturing apparatus is never paid back from the manufacturer to the customer. Therefore, the customer takes a capital investment risk, which is very high since the semiconductor device manufacturing apparatus is very expensive.

On the other hand, if the semiconductor device manufacturing apparatus has not passed a receiving inspection, or if a malfunction occurs in the semiconductor device manufacturing apparatus after it has passed a receiving inspection and the cause of the malfunction is clearly the result of a manufacturer's fault, the semiconductor device manufacturing apparatus is returned from the customer to the manufacturer, and in response to this, the manufacturer has to pay back the price of the semiconductor device manufacturing apparatus to the customer. Thus, the manufacturer also takes an equipment sales risk, which is very high since the semiconductor device manufacturing apparatus is very expensive as mentioned above.

Therefore, there has been known an operating time-base charging method in which a semiconductor device manufacturing apparatus is lent out to a customer without being sold, and a usage fee is charged according to the operating time of the semiconductor device manufacturing apparatus so as to eliminate risks involved in the sale of the semiconductor device manufacturing apparatus (see e.g. Japanese Laid-Open Patent Publication (Kokai) No. 2002-117336).

In the above operating time-base charging method, even if wafers cannot be properly processed due to malfunctions of the semiconductor device manufacturing apparatus, inappropriate settings of processing conditions, or the like, and as a result, the yield of semiconductor devices manufactured from the wafers is low, the customer is charged the same amount as in the case where the yield of the semiconductor devices is high. For example, even if no semiconductor device has been obtained during one-hour operation, the customer is charged for the one-hour operation and has to pay the amount he/she is charged. Thus, the capital investment risk taken by the customer cannot be eliminated.

Moreover, when the semiconductor device manufacturing apparatus is operating, even if the yield of semiconductor devices manufactured from the wafers is higher than expected, the customer is charged the same amount as expected. Thus, the manufacturer has no opportunity to receive a proper reward for a high yield.

Specifically, there has been the problem that profits cannot be appropriately distributed between the customer and the manufacturer according to the yield of semiconductor devices.

On the other hand, there has also been known a method in which the yield of semiconductor devices manufactured by a semiconductor device manufacturing apparatus is measured, and a fee is charged according to the measured yield. In this method, however, there is the need to directly inspect the semiconductor devices, and hence prompt charging is impossible.

SUMMARY OF THE INVENTION

It is an object of the present invention to provide a charging method for a semiconductor device manufacturing apparatus, which can appropriately and promptly distribute profits between a customer and a manufacturer according to the yield of semiconductor devices, a storage medium storing a program for implementing the charging method, and a semiconductor device manufacturing apparatus implementing the charging method.

Accordingly, in a first aspect of the present invention, there is provided a charging method for a semiconductor device manufacturing apparatus that subjects substrates to predetermined processing to manufacture semiconductor devices, comprising an indicator measurement step of measuring an indicator related to a yield of the semiconductor devices, and a charging step of charging for usage of the semiconductor device manufacturing apparatus according to the measured indicator.

According to the first aspect of the present invention, the indicator related to the yield of the semiconductor devices is measured, and a fee is charged for the usage of the semiconductor device manufacturing apparatus according to the measurement result. Since the indicator related to the yield of the semiconductor devices reflects the actual yield of the semiconductor devices, a fee can be charged based on the actual yield, and hence profits can be appropriately distributed between a customer and a manufacturer according to the yield of the semiconductor devices. Moreover, measuring the indicator related to the yield of the semiconductor devices can eliminate the necessity of directly inspecting the semiconductor devices for charging, and hence profits can be promptly distributed according to the yield of the semiconductor devices.

The present invention can provide a charging method, wherein the semiconductor device manufacturing apparatus comprises a plurality of constituent devices adapted to treat the substrates, and in the indicator measurement step, the indicator is measured with respect to each of the constituent devices.

According to the first aspect of the present invention, since the indicator is measured with respect to each of the plurality of constituent devices constituting the semiconductor device manufacturing apparatus, a fee can be appropriately charged according to the yield of the semiconductor devices with respect to each of the constituent devices by using measurement results associated with the respective constituent devices.

The present invention can provide a charging method, wherein the indicator comprises the amount of particles being present in the semiconductor device manufacturing apparatus.

According to the first aspect of the present invention, the indicator is the amount of particles being present in the semiconductor device manufacturing apparatus. Since the amount of particles properly reflects the actual yield of the semiconductor devices, a fee can be appropriately charged according to the actual yield of the semiconductor devices.

The present invention can provide a charging method, wherein the indicator comprises the number of abnormal electric discharges occurring in the semiconductor device manufacturing apparatus.

According to the first aspect of the present invention, the indicator is the number of abnormal electric discharges occurring in the semiconductor device manufacturing apparatus. Since the number of abnormal electric charges properly reflects the actual yield of the semiconductor devices, a fee can be appropriately charged according to the actual yield of the semiconductor devices.

The present invention can provide a charging method, wherein the indicator comprises one selected from a group consisting of the following: the amount of moisture and the amount of processing gas remaining in the semiconductor device manufacturing apparatus.

According to the first aspect of the present invention, the indicator is selected from a group consisting of the following: the amount of moisture and the amount of processing gas remaining in the semiconductor device manufacturing apparatus. Since the amount of moisture and the amount of processing gas properly reflect the actual yield of the semiconductor devices, a fee can be appropriately charged according to the actual yield of the semiconductor devices.

The present invention can provide a charging method, wherein the indicator is the number of vibrations occurring in the semiconductor device manufacturing apparatus.

According to the first aspect of the present invention, the indicator is the number of vibrations occurring in the semiconductor device manufacturing apparatus. Since the amount of vibrations properly reflects the actual yield of the semiconductor devices, a fee can be appropriately charged according to the actual yield of the semiconductor devices.

The present invention can provide a charging method, wherein the indicator is the amount of light emitted from plasma produced in the semiconductor device manufacturing apparatus.

According to the first aspect of the present invention, the indicator is the amount of light emitted from plasma produced in the semiconductor device manufacturing apparatus. Since the amount of light emitted from plasma produced in the semiconductor device manufacturing apparatus properly reflects the actual yield of the semiconductor devices, a fee can be appropriately charged according to the actual yield of the semiconductor devices.

The present invention can provide a charging method, wherein the semiconductor device manufacturing apparatus comprises a communicating section adapted to carry out communication with an external monitoring device, and the charging method comprises an indicator transmission step of transmitting the measured indicator to the monitoring device.

According to the first aspect of the present invention, the measured indicator related to the yield of the semiconductor devices is transmitted to the monitoring device. This makes it possible for the manufacturer to keep track of the yield of the semiconductor devices in real time even if he/she is away from the customer.

The present invention can provide a charging method, wherein the communicating section comprises the Internet.

According to the first aspect of the present invention, since the communicating section is the Internet, the measured indicator related to the yield of the semiconductor devices can be easily transmitted to the monitoring device.

Accordingly, in a second aspect of the present invention, there is provided a computer-readable storage medium storing a program for causing a computer to execute a charging method for a semiconductor device manufacturing apparatus that subjects substrates to predetermined processing to manufacture semiconductor devices, the program comprising an indicator measurement module for measuring an indicator related to a yield of the semiconductor devices, and a charging module for charging for usage of the semiconductor device manufacturing apparatus according to the measured indicator.

According to the second aspect of the present invention, the indicator related to the yield of the semiconductor devices is measured, and a fee is charged for the usage of the semiconductor device manufacturing apparatus according to the measurement result. Since the indicator related to the yield of the semiconductor devices reflects the actual yield of the semiconductor devices, a fee can be charged based on the actual yield, and hence profits can be appropriately distributed between a customer and a manufacturer according to the yield of the semiconductor devices. Moreover, measuring the indicator related to the yield of the semiconductor devices can eliminate the necessity of directly inspecting the semiconductor devices for charging, and hence profits can be promptly distributed according to the yield of the semiconductor devices.

Accordingly, in a third aspect of the present invention, there is provided a semiconductor device manufacturing apparatus that subjects substrates to predetermined processing to manufacture semiconductor devices, comprising an indicator measurement device adapted to measure an indicator related to a yield of the semiconductor devices, and a charging device adapted to charge for usage of the semiconductor device manufacturing apparatus according to the measured indicator.

According to the third aspect of the present invention, the indicator related to the yield of the semiconductor devices is measured, and a fee is charged for the usage of the semiconductor device manufacturing apparatus according to the measurement result. Since the indicator related to the yield of the semiconductor devices reflects the actual yield of the semiconductor devices, a fee can be charged based on the actual yield, and hence profits can be appropriately distributed between a customer and a manufacturer according to the yield of the semiconductor devices. Moreover, measuring the indicator related to the yield of the semiconductor devices can eliminate the necessity of directly inspecting the semiconductor devices for charging, and hence profits can be promptly distributed according to the yield of the semiconductor devices.

The above and other objects, features, and advantages of the invention will become more apparent from the following detained description taken in conjunction with the accompanying drawings.

DETAILED DESCRIPTION OF THE PREFERRED EMBODIMENTS

The present invention will now be described in detail with reference to the drawings showing preferred embodiments thereof.

First, a description will be given of a charging method according to a first embodiment of the present invention.

Figure 1:
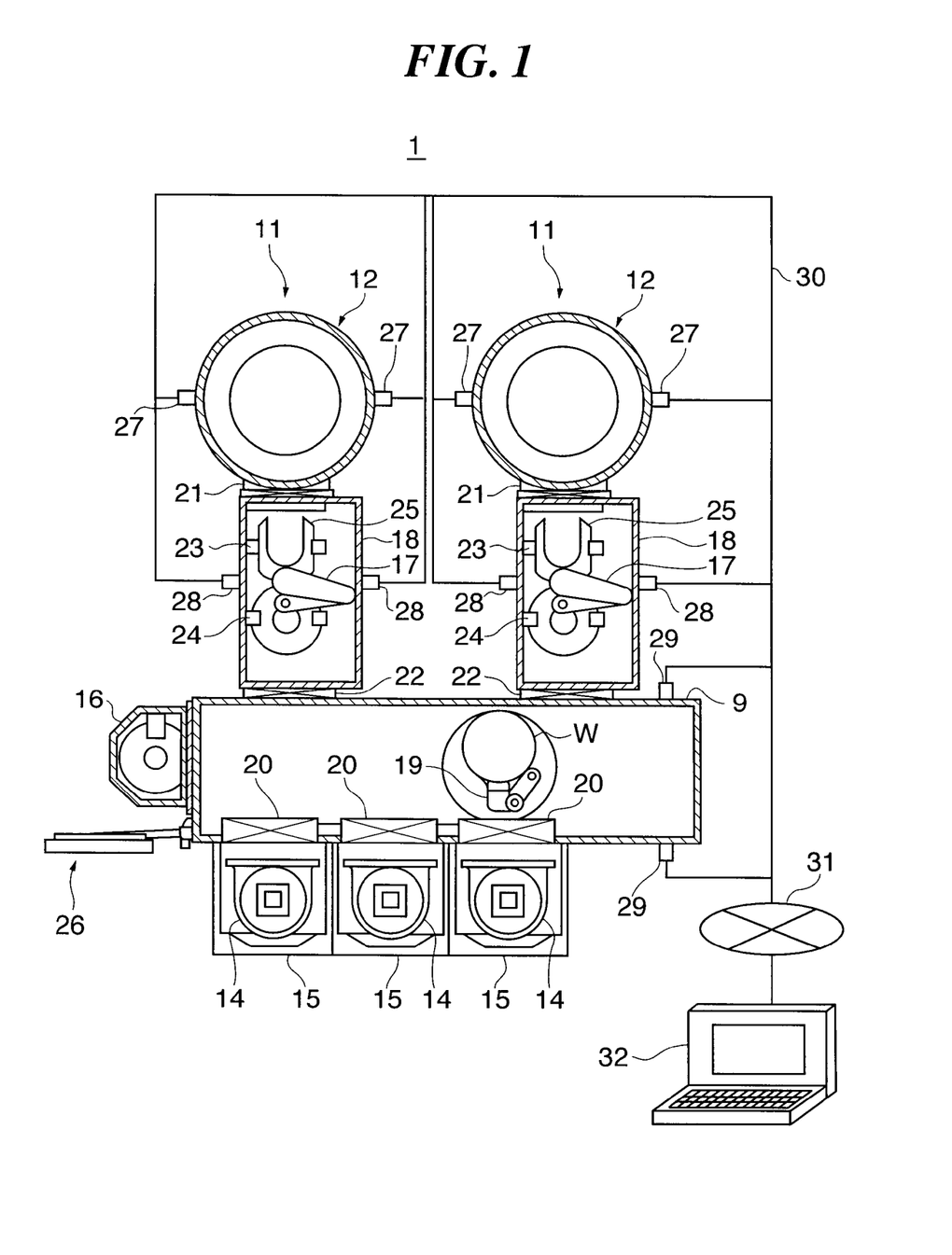
FIG. 1 is a plan view schematically showing the construction of a semiconductor device manufacturing apparatus to which a charging method according to a first embodiment of the present invention is applied.

FIG. 1 is a plan view schematically showing the construction of a semiconductor device manufacturing apparatus to which the charging method according to the present embodiment is applied.

As showing in FIG. 1, a substrate processing apparatus 1 which is a semiconductor device manufacturing apparatus is comprised of a plurality of process ships 11 that subjects semiconductor device wafers (hereinafter merely referred to as "wafers") W to RIE (Reactive Ion Etching) processing, and a loader module 9 (constituent device) as an atmospheric common transfer chamber to which the plurality of process ships 11 are connected.

Three FOUP (Front Opening Unified Pod) mounting stages 15 on which respective FOUPs 14 as containers housing respectively 25 wafers W are mounted, and an orienter 16 that carries out prealignment of the wafers W transferred out from the FOUPs 14 are connected to the loader module 9.

The plurality of process ships 11 are connected to a longitudinal side wall of the loader module 9 and disposed in opposed relation to the three FOUP mounting stages 15 with the loader module 9 interposed therebetween. The orienter 16 is disposed at a distal end of the loader module 9 in the longitudinal direction thereof.

The loader module 9 has therein a transfer arm mechanism 19 that transfers wafers W, and three load ports 20 which are disposed on a side wall of the loader module 9 and at locations corresponding to the respective FOUP mounting stages 15 and via which wafers W are loaded. The transfer arm mechanism 19 removes wafers W from the FOUPs 14 mounted on the FOUP mounting stages 15 via the load ports 20 and transfers the removed wafers W into the process ships 11 and the orienter 16.

The process ships 11 are each comprised of a chamber 12 (constituent device) as a vacuum chamber that subjects the wafers W to the RIE processing, and a load lock module 18 (constituent device) having therein a transfer arm 17 that transfers the wafers W into the chamber 12.

The interior of the chamber 12 of each process ship 11 is always held under vacuum, while the interior of the loader module 9 is always held at atmospheric pressure. Accordingly, the load lock module 18 is equipped with a vacuum gate valve 21 at a place where the load lock module 18 and the chamber 12 are joined, and an atmosphere gate valve 22 at a place where the load lock module 18 and the loader module 8 are joined, so that the load lock module 18 functions as a vacuum auxiliary transfer chamber capable of adjusting pressure therein.

In each load lock module 18, the transfer arm 17 is disposed in substantially the central part, a first buffer 23 is disposed on the chamber 12 side of the transfer arm 17, and a second buffer 24 is disposed on the loader module 9 side of the transfer arm 17. The first buffer 23 and the second buffer 24 are disposed on the path traced by a pick 25 that is disposed at a distal end of the transfer arm 17 and supports a wafer W. A wafer W that has already been subjected to the RIE processing is temporarily withdrawn to an area above the path traced by the pick 25, and hence a wafer W that has not yet been subjected to the RIE processing and a wafer W that has already been subjected to the RIE processing can be smoothly replaced with each other in the chamber 12.

The substrate processing apparatus 1 is also comprised of an operation GUI (Graphical User Interface) 26 disposed at a distal end of the loader module 8 in the longitudinal direction thereof.

If particles suspended in the chamber 12, the load lock module 18, and the loader module 9 become attached to semiconductor devices manufactured by the substrate processing apparatus 1, errors such as a short circuit occur in the semiconductor devices. As the amount of floating particles increases, the amount of particles attached to the semiconductor devices also increases, resulting in the yield of the semiconductor devices decreasing. Specifically, the amount of particles is an indicator of the yield of the semiconductor devices and reflects the actual yield of the semiconductor devices. In the charging method according to the present embodiment, the amount of particle suspended in the chamber 12, the load lock module 18, and the loader module 9 is measured, and a fee is charged for the usage of the substrate processing apparatus 1 according to the measurement results.

Accordingly, the chamber 12, load lock module 18, and loader module 9 of the substrate processing apparatus 1 are equipped with sensors 27, 28, and 29, respectively, which measure the amount of particles suspended in the chamber 12, the load lock module 18, and the loader module 9. The sensors 27, 28, and 29 are connected to a PC (Personal Computer) 32 (charging device and monitoring device) installed at an outside place such as an office of a manufacturer of the substrate processing apparatus 1 via an electric wire 30 and the Internet 31 (connecting section), and measurement results are transmitted to the PC 32 via the Internet 31 or the like.

Figure 2:
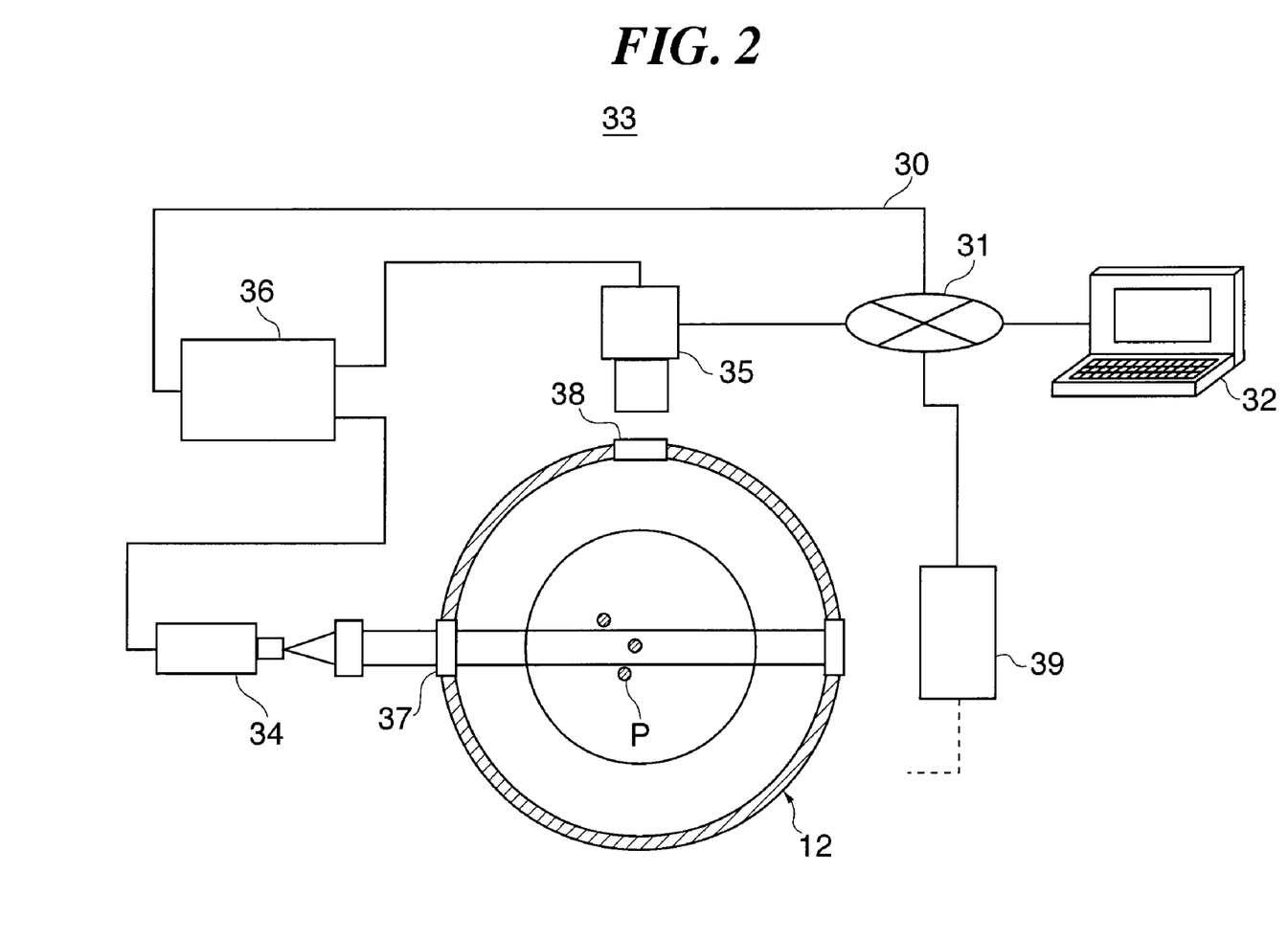
FIG. 2 is a view schematically showing the construction of a particle monitor using laser scattering light.

The sensors 27, 28, and 29 may be implemented in various forms, and for example, the sensor 27 may be implemented by a particle monitor 33 (indicator measurement device) using laser scattering light as shown in FIG. 2.

As shown in FIG. 2, the particle monitor 33 is comprised of a laser oscillator 34 that emits laser lights, a CCD camera 35 that observes scattering light in the chamber 12, and a pulse generator 36 that is connected to the laser oscillator 34 and the CCD camera 35.

The laser oscillator 34 radiates laser light into the chamber 12 via a slit 37 formed in the chamber 12 while the RIE processing is being carried out in the chamber 12. When radiated with the laser light, particles P in the chamber 12 generate scattering light. The generated scattering light is observed by the CCD camera 35 via a slit 38. At this time, the number of occurrences of scattering light generation and the intensity of scattering light correspond to the amount of particles P suspended in the chamber 12. Thus, the particle monitor 33 measures the amount of particles P suspended in the chamber 12 through the number of occurrences of scattering light generation and the intensity of scattering light (indicator measurement step). The measured amount of particles P is transmitted as a measurement result to the PC 32 via the Internet 31 or the like.

It should be noted that the pulse generator 36 transmits synchronization signals to the laser oscillator 34 and the CCD camera 35, so that the timing of laser light oscillation and the timing of scattering light observation are adjusted.

The particle monitor 33 is also comprised of a device status signal transmitting section 39 that receives a device status signal, which is indicative of the operation status of the chamber 12 and the presence or absence of an error in the chamber 12, from the chamber 12 and transmits the received device status signal to the PC 32 via the Internet 31 or the like.

Referring again to FIG. 1, the PC 32 monitors the operation status of the chamber 12 and the presence or absence of an error in the chamber 12 based on the received device status signal and also charges for the usage of the substrate processing apparatus 1 according to the amount of particles P suspended in the chamber 12, which is the received measurement result (charging step).

According to the charging method based on the amount of particles P suspended in the chamber 12, for example, the larger the number of particles P in the chamber 12 found by the particle monitor 33 during the RIE processing on one wafer W, the lower usage fee charged. Specifically, if the measured number of particles P is 0 to 10, a usage fee of 100,000 yen is charged; if the measured number of particles P is 11 to 100, a usage fee of 50,000 yen is charged; if the measured number of particles P is 101 to 500, a usage fee of 30,000 yen is charged; if the measured number of particles P is 501 to 1,000, a usage fee of 10,000 yen is charged; and if the measured number of particles P is not less than 1,001, a usage fee of 0 yen is charged. It should be noted that theses usage fees are just a few examples, and the usage fee varies according to the unit price of semiconductor devices ultimately manufactured and the price of the substrate processing apparatus 1.

In the substrate processing apparatus 1, the amounts of particles P in the load lock module 18 and the loader module 9 as well as the chamber 12 are measured by the sensors 28 and 29 (indicator measurement devices), and the measurement results are transmitted to the PC 32 via the Internet 31 or the like. The PC 32 carries out charging for the usage of the substrate processing apparatus 1 according to the amounts of particles P suspended in the load lock module 18 and the loader module 9, which are the received measurement results, as well as the amount of particles P suspended in the chamber 12. It should be noted that the load lock module 18 and the loader module 9 of the substrate processing apparatus 1 as well transmit device status signals, which are indicative of the operation statuses of the load lock module 18 and the loader module 9 and the presence or absence of an error in the load lock module 18 and the loader module 9, to the PC 32 via the Internet 31 or the like.

In the charging method according to the present embodiment, the amount of particles P suspended in the chamber 12, the load lock module 18, and the loader module 9 is measured, and a fee is charged for the usage of the substrate processing apparatus 1 according to the measurement results. Since the amount of particles P reflects the actual yield of semiconductor devices manufactured by the substrate processing apparatus 1, a fee can be charged based on the actual yield, and hence profits can be appropriately distributed between a customer and a manufacturer according to the yield of the semiconductor devices. Moreover, measuring the amount of particles P can eliminate the necessity of directly inspecting the semiconductor devices at the time of charging, and hence profits can be promptly distributed according to the yield of semiconductor devices. In particular, using the particle monitor 33 enables measurement of the amount of particles P in the chamber 12 during the RIE processing and hence enables real-time charging.

In the charging method according to the present embodiment, since the measured amount of particles P suspended in the chamber 12, the load lock module 18, and the loader module 9 is transmitted to the PC 32, the manufacturer can keep track of the yield of semiconductor devices in real time even if he/she is away from the customer, e.g. at an office. Moreover, since device status signals are transmitted from the chamber 12, the load lock module 18, and the loader module 9 to the PC 32 via the Internet 31 or the like, the manufacturer can know the statuses of these devices in real time. Since the measured amounts of particles P and the device status signals are transmitted to the PC 32 via the Internet 31 or the like, they can be transmitted to the PC 32 with ease.

Although in the charging method according to the present embodiment, a fee is charged for the usage of the substrate processing apparatus 1 according to measurement results, fees are separately charged for the usages of the chamber 12, the load lock module 18, and the loader module 9 according to measurement results. In this case, the measurement results reflect the actual yields of semiconductor devices in the respective ones of the chamber 12, the load lock module 18, and the loader module 9. Thus, by using measurement results, fees can be appropriately charged for the usages of the chamber 12, the load lock module 18, and the loader module 9 according to the yields of the semiconductor devices in the respective ones.

Figure 3:
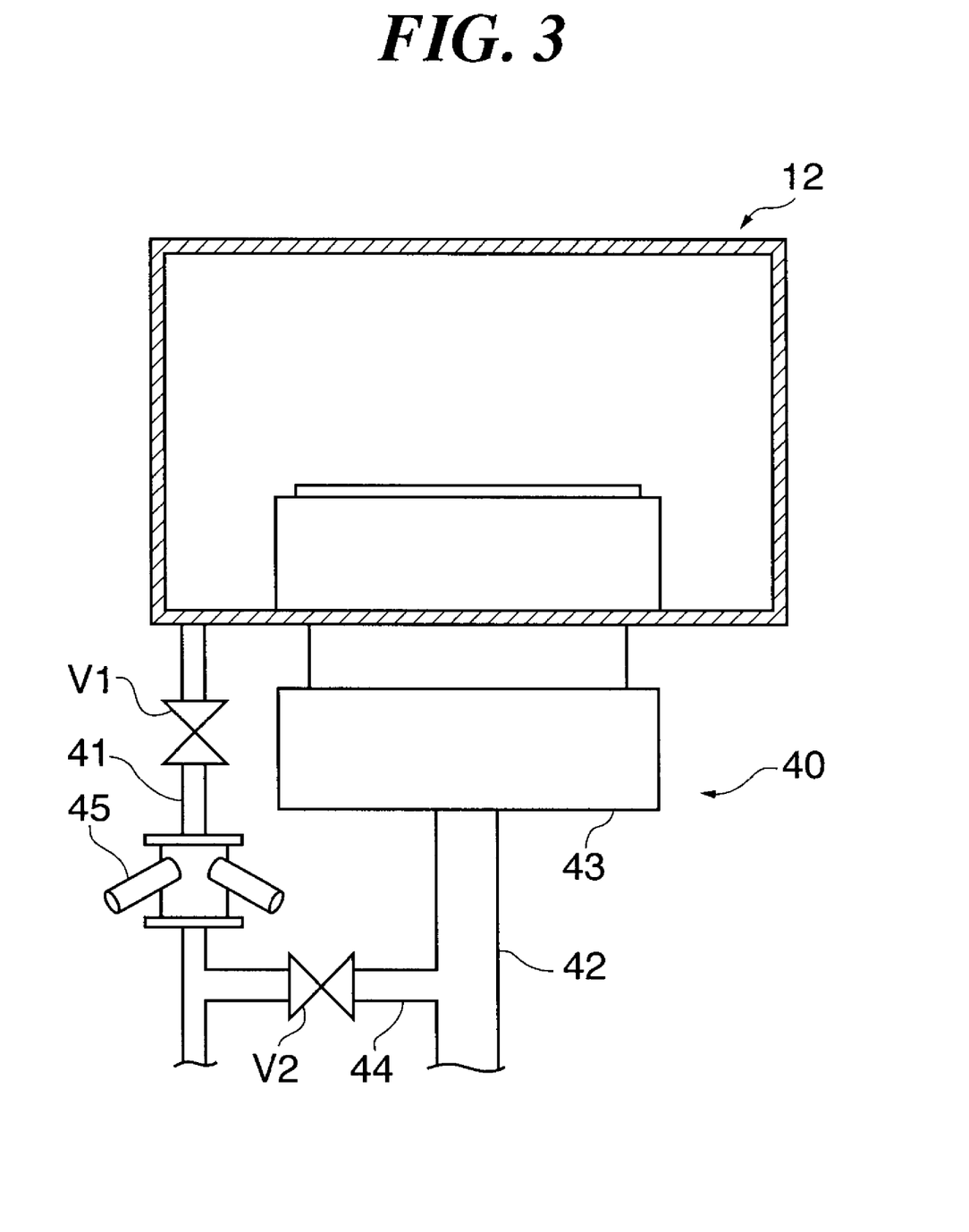
FIG. 3 is a view schematically showing the construction of an exhaust system that exhausts the interior of a chamber appearing in FIG. 1.

Incidentally, as shown in FIG. 3, the substrate processing apparatus 1 is comprised of an exhaust system 40 that exhausts the interior of the chamber 12. The exhaust system 40 is equipped with a roughing exhaust line 41 and a main exhaust line 42. The roughing exhaust line 41 is connected to a dry pump, not shown, and roughly exhausts the interior of the chamber 12. The main exhaust line 42 includes a turbo molecule pump (TMP) 43, which highly vacuums the interior of the chamber 12. The main exhaust line 42 includes a branch line 44 that is connected to the roughing exhaust line 41. It should be noted that valves V1 and V2 capable of halting the flow of gas through the roughing exhaust line 41 and the branch line 44 are provided in the roughing exhaust line 41 and the branch line 44, respectively.

Here, since the exhaust system 40 exhausts the interior of the chamber 12 including particles P, the amount of particles in the exhaust system 40 is closely related to the amount of particles P suspended in the chamber 12. For this reason, the amount of particles in the exhaust system 40 is an indicator of the yield of semiconductor devices and reflects the actual yield of the semiconductor devices. Thus, in a variation of the charging method according to the present embodiment, the amount of particles in the exhaust system 40 may be measured, and a fee may be charged for the usage of the substrate processing apparatus 1 according to the measurement result.

The amount of particles in the exhaust system 40 may be measured while a sequence for cleaning the interior of the chamber 12 is carried out using an ISPM (In Situ Particle Monitor) 45 (indicator measurement device) disposed part way along the roughing exhaust line 41. The sequence for cleaning the chamber 12 is not accompanied by plasma generation, and hence the amount of particles can be easily measured in a simple way, and as a result, a fee can be easily charged for the usage of the substrate processing apparatus 1 in a simple way.

Specifically, in this charging method based on the amount of particles in the exhaust system 40, if the measured number of particles is 0 to 5, a usage fee of 200,000 yen is charged per day; if the measured number of particles is 6 to 40, a usage fee of 100,000 yen is charged per day; if the measured number of particles is 41 to 100, a usage fee of 50,000 yen is charged per day; if the measured number of particles is 101 to 1,000, a usage fee of 10,000 yen is charged per day; and if the measured number of particles is not less than 1,001, a usage fee of 0 yen is charged per day.

Moreover, the amount of particles in the exhaust system 40 may be measured using an ISPM, not shown, disposed part way along the main exhaust line 42. Since the main exhaust line 42 exhausts the interior of the chamber 12 during the RIE processing, a fee may be charged in real time while the RIE processing is being carried out.

In the substrate processing apparatus 1 described above, the indicator that reflects the actual yield of semiconductor devices in the loader module 9 is not limited to the amount of particles, but may be, for example, the cleanliness level indicative of the contamination state of the interior of the loader module 9. Thus, the sensor 29 of the loader module 9 may measure the cleanliness level in the interior of the loader module 9, and a fee may be charged for the usage of the substrate processing apparatus 1 according to the cleanliness class (JIS B 9920; refer to Table 1 below).

TABLE 1

| Particle diameter (μm) | Cleanliness class | | | | | | | |
|---|---|---|---|---|---|---|---|---|
| | Class 1 | Class 2 | Class 3 | Class 4 | Class 5 | Class 6 | Class 7 | Class 8 |
| 0.1 | $10^1$ | $10^2$ | $10^3$ | $10^4$ | $10^5$ | $(10^6)$ | $(10^7)$ | $(10^8)$ |
| 0.2 | 2 | 24 | 336 | 2360 | 23600 | — | — | — |
| 0.3 | 1 | 10 | 101 | 1010 | 10100 | 101000 | 1010000 | 10100000 |
| 0.5 | (0.35) | (3.5) | 35 | 350 | 3500 | 35000 | 350000 | 3500000 |
| 5 | — | — | — | — | 29 | 290 | 2900 | 29000 |
| Cleanliness class particle diameter range | 0.1-0.3 | | 0.1-0.5 | | 0.1-0.5 | | 0.3-5.0 | |

Specifically, in this charging method based on the cleanliness class, if the cleanliness class is 1 to 2, a usage fee of 200,000 yen is charged per day; if the cleanliness class is 3 to 4, a usage fee of 100,000 yen is charged per day; if the cleanliness class is 5, a usage fee of 50,000 yen is charged per day; and if the cleanliness class is 6 to 8, a usage fee of 10,000 yen is charged.

The measured cleanliness level is transmitted to the PC 32, and hence the manufacturer can keep track of the contamination state of the interior of the loader module 9 in real time.

A description will be given of a charging method according to a second embodiment of the present invention.

The second embodiment is identical in basic construction and operation with the above described first embodiment and differs from the above described first embodiment only in that a usage fee is charged according to the number of abnormal electric discharges, not the amount of particles. Therefore, description of the same arrangement is omitted, and only the operation different from that of the first embodiment will be described below.

In the chamber 12 of this substrate processing apparatus 1, if an abnormal electric discharge occurs during the RIE processing on wafers W, this causes damage to semiconductor devices on the wafers W. As the number of abnormal electric discharges increases, the degree of damage to the semiconductor devices on the wafers W also increases, resulting in the yield of the semiconductor devices decreasing. Specifically, the number of abnormal electric discharges is an indicator related to the yield of the semiconductor devices and reflects the actual yield of the semiconductor devices. In the charging method according to the present embodiment, the number of abnormal electric discharges in the chamber 12 during the RIE processing is measured, and a fee is charged for the usage of the substrate processing apparatus 1 according to the measurement result.

Figure 4:
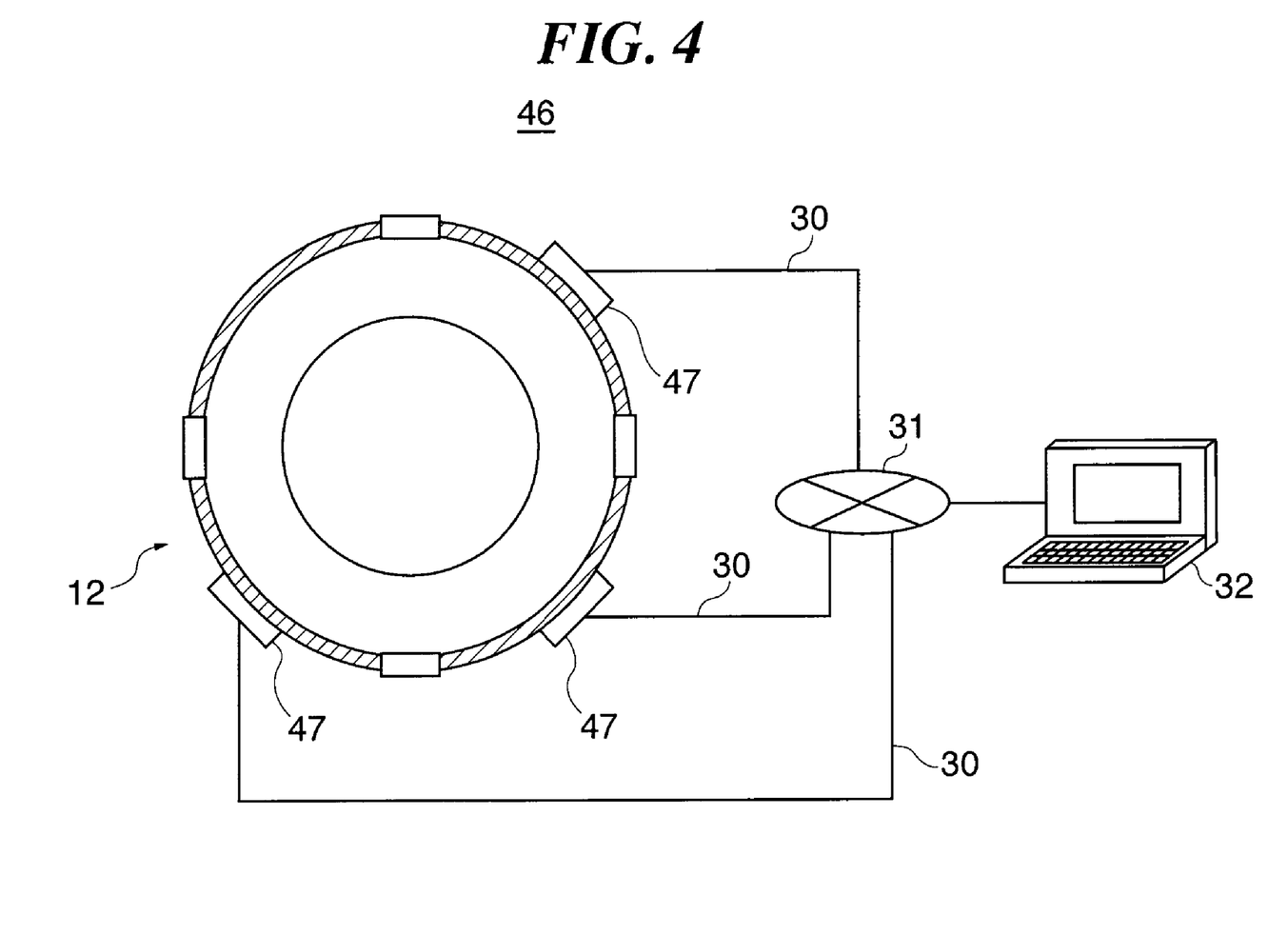
FIG. 4 is a view schematically showing the construction of an abnormal electric discharge monitoring system provided in the chamber appearing in FIG. 1.

Accordingly, the chamber 12 is equipped with an abnormal electric discharge monitoring system 46 (indicator measurement device) that detects abnormal electric discharges, as shown in FIG. 4. The abnormal electric discharge monitoring system 46 is comprised of three ultrasonic sensors 47, for example, an AE sensor, an acoustic sensor, and a microphone disposed on a side-wall of the chamber 12. The three ultrasonic sensors 47 are connected to the PC 32 via the electric wire 30 and the Internet 31.

When an abnormal electric discharge occurs in the chamber 12, an ultrasonic wave is generated. The generated ultrasonic wave is detected by the ultrasonic sensors 47. At this time, the number of detections of ultrasonic waves corresponds to the number of abnormal electric discharges. Thus, the abnormal electric discharge monitoring system 46 measures the number of abnormal electric discharges occurring in the chamber 12 (indicator measurement step) using the number of detections of ultrasonic waves. Then, the measured number of abnormal electric discharges is transmitted as a measurement result to the PC 32 via the Internet 31 or the like.

Specifically, in this charging method based on the number of abnormal electric discharges occurring in the chamber 12, if the number of abnormal electric discharges is 0 to 10, a usage fee of 50,000 yen is charged per day; if the number of abnormal electric discharges is 11 to 50, a usage fee of 10,000 yen is charged per day; and if the number of abnormal electric discharges is not less than 51, a usage fee of 0 yen is charged per day.

In the charging method according to the present embodiment, the number of abnormal electric discharges occurring in the chamber 12 is measured, and a fee is charged for the usage of the substrate processing apparatus 1 according to the measurement result. Since the number of abnormal electric discharges reflects the actual yield of semiconductor devices manufactured by the substrate processing apparatus 1, profits can be appropriately distributed between the customer and the manufacturer according to the yield of the semiconductor devices. Moreover, measuring the number of abnormal electric discharges can eliminate the necessity of directly inspecting the semiconductor devices at the time of charging.

It should be noted that when an abnormal electric discharge occurs in the chamber 12, not only an ultrasonic wave is generated but also an RF traveling wave in high-frequency power applied to the interior of the chamber 12 or a reflected wave of high-frequency power changes, and further, a direct-current voltage or direct current applied to an electrostatic adsorption plate that adsorbs a wafer W in the chamber 12 changes. Thus, such changes may be measured, and a fee may be charged according to the measurement results.

A description will be given of a charging method according to a third embodiment of the present invention.

The third embodiment is identical in basic construction and operation with the above described first embodiment and differs from the above described first embodiment only in that a usage fee is charged according to the amounts of processing gas or moisture remaining in each constituent device, not the amount of particles. Therefore, description of the same arrangement is omitted, and only the operation different from that of the first embodiment will be described below.

If processing gas and moisture remain in the chamber 12, the load lock module 18, and the loader module 9, moisture coagulated due to adiabatic expansion becomes attached to semiconductor devices, and an acid compound formed by the reaction of the moisture and the processing gas corrodes electric wires and other components of the semiconductor devices. As the amount of residual processing gas or moisture increases, the probability of corrosion in the semiconductor devices also increases, resulting in the yield of the semiconductor devices decreasing. Specifically, the amount of residual processing gas and moisture is an indicator of the yield of the semiconductor devices and reflects the actual yield of the semiconductor devices. In the charging method according to the present embodiment, the amount of processing gas and moisture remaining in the constituent devices (chamber 12, load lock module 18, and loader module 9) is measured, and a fee is charged for the usage of the substrate processing apparatus 1 according to the measurement result.

Accordingly, the sensors 27, 28, and 29 measure the amount of moisture or processing gas in the respective constituent devices (indicator measurement step). Then, the measured amount of moisture or processing gas is transmitted as a measurement result to the PC 32 via the Internet 31 or the like.

In the charging method according to the present embodiment, the amount of processing gas or moisture remaining in the constituent devices is measured, and a fee is charged for the usage of the substrate processing apparatus 1 according to the measurement result. Since the amount of processing gas and moisture remaining in the constituent devices reflects the actual yield of semiconductor devices manufactured by the substrate processing apparatus 1, profits can be appropriately distributed between the customer and the manufacturer according to the yield of the semiconductor devices. Moreover, measuring the amount of processing gas or moisture remaining in the constituent devices can eliminate the necessity of directly inspecting the semiconductor devices at the time of charging.

It should be noted that the probability of corrosion in the semiconductor devices varies depending on the components of residual processing gas. Specifically, the components of residual processing gas are also an indicator related to the yield of the semiconductor devices. Therefore, the components of residual processing gas may be measured, and a fee may be charged according to the measurement results. To measure the components of residual processing gas, it is preferred that the sensors 27, 28, and 29 are implemented by an infrared adsorption sensor, an FTIR (Fourier Transform Infrared Spectrometer), a QMS (Quadrupole Mass Spectrometer), and so on.

A description will be given of a charging method according to a fourth embodiment of the present invention.

The fourth embodiment is identical in basic construction and operation with the above described first embodiment and differs from the above described first embodiment only in that a usage fee is charged according to the number of vibrations occurring in each constituent device, not the amount of particles. Therefore, description of the same arrangement is omitted, and only the operation different from that of the first embodiment will be described below.

Figure 5:
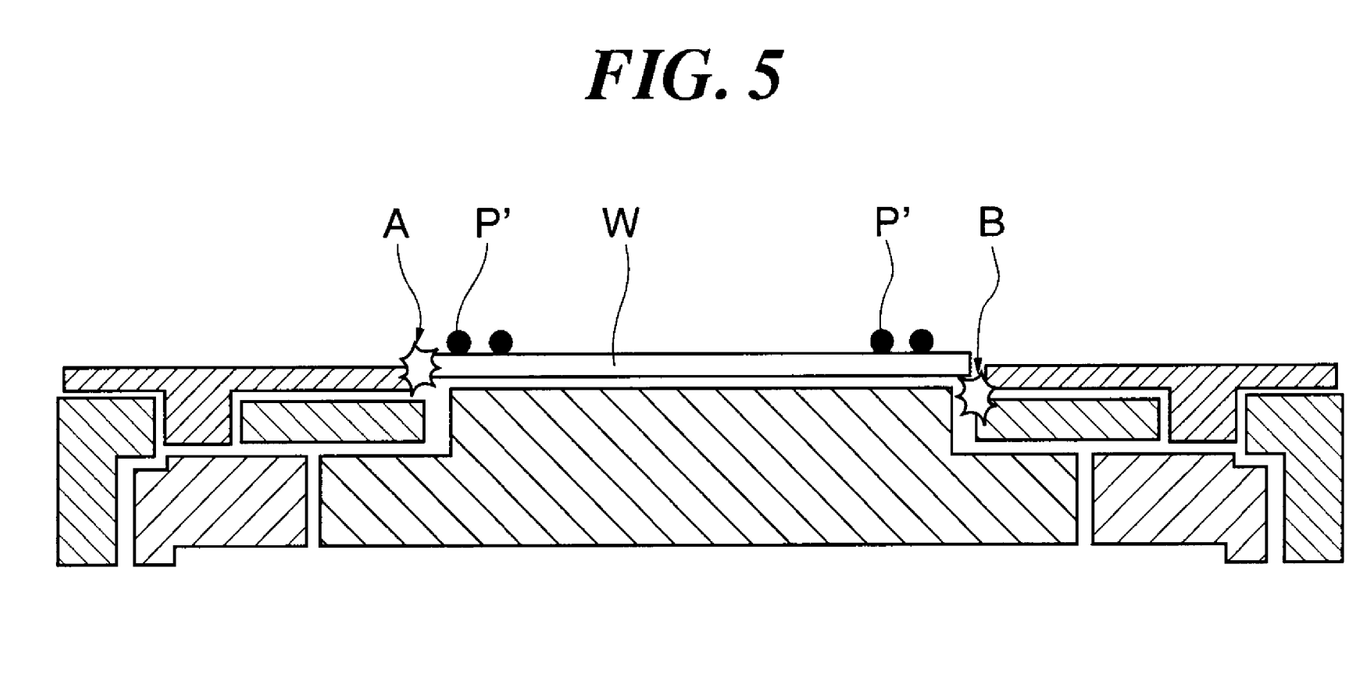
FIG. 5 is a view showing a collision of a wafer and a component or a collision of components in the semiconductor device manufacturing apparatus in FIG. 1.

As shown in FIG. 5, in each of the constituent devices (chamber 2, load lock module 18, and loader module 9) of the substrate processing apparatus 1, when a wafer W collides with a component of the constituent device due to a transfer error caused by the transfer arm 17 (see an area indicated by an arrow A in FIG. 5), or components of the constituent device collide with each other due to an assembly error or the like (see an area indicated by an arrow B in FIG. 5), a part of the component or components falls away to fly in the form of particles P'. The particles P' are comprised mainly of quarts or anodized aluminum. The particles P' as well decrease the yield of semiconductor devices.

Whenever the particles P' are generated, a collision of a wafer W and a component or a collision of components has occurred, and hence, vibrations occurs in each constituent device. As the number of vibrations occurring in each constituent device increases, the number of particles P' generated also increases. Therefore, the number of vibrations occurring in each constituent device is an indicator related to the yield of the semiconductor devices and reflects the actual yield of the semiconductor devices.

In the charging method according to the present embodiment, the number of vibrations occurring in each of the constituent devices (chamber 12, load lock module 18, and loader module 9) is measured, and a fee is charged for the usage of the substrate processing apparatus 1 according to the measurement result.

Accordingly, the sensors 27, 28, and 29 measure the number of vibrations occurring in the respective constituent devices (indicator measurement step). The measured number of vibrations is transmitted as a measurement result to the PC 32 via the Internet 31 or the like. It should be noted that, to reliably detect occurring vibrations, a vibration detecting sensor is preferably mounted on a transfer arm 17 or a mounting stage on which a wafer W is mounted disposed in the chamber 12.

Specifically, in this charging method based on the number of vibrations occurring in the constituent devices, for example, while one wafer W is being subjected to the RIE processing, if the measured number of vibrations is 0 to 10, a usage fee of 20,000 yen is charged per day; if the measured number of vibrations is 11 to 50, a usage fee of 10,000 yen is charged per day; and if the measured number of vibrations is not less than 51, a usage fee of 0 yen is charged per day.

In the charging method according to the present embodiment, the number of vibrations occurring in the constituent devices is measured, and a fee is charged for the usage of the substrate processing apparatus 1 according to the measurement result. Since the number of vibrations occurring in the constituent devices reflects the actual yield of semiconductor devices manufactured by the substrate processing apparatus 1, profits can be appropriately distributed between the customer and the manufacturer according to the yield of the semiconductor devices. Moreover, measuring the number of vibrations occurring in the constituent devices can eliminate the necessity of directly inspecting the semiconductor devices at the time of charging.

A description will be given of a charging method according to a fifth embodiment of the present invention.

The fifth embodiment is identical in basic construction and operation with the above described first embodiment and differs from the above described first embodiment only in that a usage fee is charged according to the amount of light emitted from plasma produced in the chamber 12, not the amount of particles. Therefore, description of the same arrangement is omitted, and only the operation different from that of the first embodiment will be described below.

If the distribution of plasma goes wrong in the chamber 12, the RIE processing cannot be properly carried out on wafers W (for example, a desired etch rate cannot be realized), resulting in the yield of semiconductor devices decreasing. Since the amount of light emitted from plasma produced in the chamber 12 changes when the distribution of plasma goes wrong, the amount of light emitted from plasma produced in the chamber 12 is an indicator related to the yield of the semiconductor devices and reflects the actual yield of the semiconductor devices.

In the charging method according to the present embodiment, the amount of light emitted from plasma produced in the chamber 12 is measured, and a fee is charged for the usage of the substrate processing apparatus 1 according to the measurement result.

Accordingly, the sensor 27 is configured as a plasma light emission monitor and measures the amount of light emitted from plasma produced in the chamber 12 (indicator measurement step). Then, the measured amount of light emitted from plasma produced in the chamber 12 is transmitted as a measurement result to the PC 32 via the Internet 31 or the like.

In the charging method according to the present embodiment, the amount of light emitted from plasma produced in the chamber 12 is measured, and a fee is charged for the usage of the substrate processing apparatus 1 according to the measurement result. Since the amount of light emitted from plasma produced in the chamber 12 reflects the actual yield of semiconductor devices manufactured by the substrate processing apparatus 1, profits can be appropriately distributed between the customer and the manufacturer according to the yield of the semiconductor devices. Moreover, measuring the amount of light emitted from plasma produced in the chamber 12 can eliminate the necessity of directly inspecting the semiconductor devices at the time of charging.

The indicators related to the yield of semiconductor devices are not limited to those used in the above described embodiments, but for example, the conditions of damage to components of the constituent devices of the substrate processing apparatus 1 may be used as indicators.

Although each of the above described embodiments is applied independently to the substrate processing apparatus 1, two or more of the above described embodiments may be collectively applied to the substrate processing apparatus 1. For example, the amount of particles P as well as the number of vibrations occurring in each constituent device are measured, and a fee may be charged according to the measurement results. In this case, it is preferred that weights are assigned to the measurement results, and a usage fee is charged with consideration given to the assigned weights.

In the above described embodiments, it can be considered that the customer reduces the usage fee by intentionally making some alterations on the constituent devices of the substrate processing apparatus 1 and thereby degrading the results of measurements conducted on indicators related to the yield of semiconductor devices. To cope with this, the substrate processing apparatus 1 or the PC 32 may be equipped with a self testing function of determining whether or not alterations have been intentionally made on any constituent device of the substrate processing apparatus 1.

Moreover, although in the above described embodiments, it is assumed that the price of the substrate processing apparatus 1 is not paid only after the substrate processing apparatus 1 has passed a receiving inspection, it may be arranged such that only a part of the price of the substrate processing apparatus 1 may be paid after the substrate processing apparatus 1 has passed a receiving inspection.

Although in the above described embodiments, the present invention is applied to the semiconductor device manufacturing apparatus, this is not limitative, but the present invention may be applied to any apparatuses insofar as they can process substrates. Further, substrates to be processed are not limited to wafers, but rather may instead be various substrates used in LCDs (Liquid Crystal Displays), FPDs (Flat Panel Displays) or the like, photomasks, CD substrates, printed substrates, or the like.

Further, it is to be understood that the object of the present invention may also be accomplished by supplying a computer with a storage medium in which a program code of software, which realizes the functions of any of the above described embodiments is stored, and causing a CPU of the computer to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a RAM, an NV-RAM, a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded from another computer, a database, or the like, not shown, connected to the Internet, a commercial network, a local network, or the like.

Further, it is to be understood that the functions of any of the above described embodiments may be accomplished not only by executing a program code read out by a computer, but also by causing an OS (operating system) or the like which operates on a CPU to perform a part or all of the actual operations based on instructions of the program code.

Further, it is to be understood that the functions of any of the above described embodiments may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

The form of the program code may be an object code, a program code executed by an interpreter, script data supplied to an OS, or the like.

What is claimed is:
1. A charging method for a semiconductor device manufacturing apparatus that subjects substrates to predetermined processing to manufacture semiconductor devices, comprising:

measuring, by the semiconductor device manufacturing apparatus, an indicator related to a yield of the semiconductor devices manufactured from the substrates; and charging for usage of the semiconductor device manufacturing apparatus according to the measured indicator, wherein a chamber of the semiconductor device manufacturing apparatus is exhausted, wherein the indicator comprises an amount of particles discharged from the chamber of the semiconductor device manufacturing apparatus and being present in an exhaust system that exhausts an interior of the chamber when the interior of the chamber is exhausted.

2. A charging method as claimed in claim 1, wherein the semiconductor device manufacturing apparatus comprises a plurality of constituent devices adapted to treat the substrates, and in said measuring step, the indicator is measured with respect to each of the constituent devices.

3. A charging method as claimed in claim 1, wherein the semiconductor device manufacturing apparatus comprises a communicating section adapted to carry out communication with an external monitoring device, and the charging method comprises transmitting the measured indicator to the monitoring device.

4. A charging method as claimed in claim 3, wherein the communicating section comprises the Internet.

5. A charging method as claimed in claim 1, wherein in said charging step, the usage of the semiconductor device manufacturing apparatus is charged according to a plurality of measured indicators, the measured indicators including at least two indicators selected from an indicator group comprising:

the amount of particles suspended in the chamber of the semiconductor device manufacturing apparatus;

a number of changes in a radio-frequency voltage or a direct-current voltage applied to a component part of the semiconductor device manufacturing apparatus;

an amount of moisture remaining in the semiconductor device manufacturing apparatus;

an amount of processing gas remaining in the semiconductor device manufacturing apparatus;

a number of vibrations occurring in the semiconductor device manufacturing apparatus; and an amount of light emitted from plasma produced in the semiconductor device manufacturing apparatus.

6. A charging method as claimed in claim 5, wherein weights are assigned to the measured indicators, and a usage fee is charged based on the assigned weights.

7. A charging method as claimed in claim 1, wherein said measuring step is executed while a sequence for cleaning the interior of the chamber is carried out.

8. A charging method as claimed in claim 1, wherein, in said measuring step, the amount of particles in a main exhaust line of the exhaust system is measured.

9. A non-transitory computer-readable storage medium storing a program for causing a computer to execute a charging method for a semiconductor device manufacturing apparatus that subjects substrates to predetermined processing to manufacture semiconductor devices, the program comprising:

an indicator measurement module adapted to measure an indicator related to a yield of the semiconductor devices manufactured from the substrates; and a charging module adapted to charge for usage of the semiconductor device manufacturing apparatus according to the measured indicator, wherein a chamber of the semiconductor device manufacturing apparatus is exhausted, wherein the indicator comprises an amount of particles discharged from the chamber of the semiconductor device manufacturing apparatus and being present in an exhaust system that exhausts an interior of the chamber when the interior of the chamber is exhausted.

10. A semiconductor device manufacturing apparatus that subjects substrates to predetermined processing to manufacture semiconductor devices, comprising:

an indicator measurement device adapted to measure an indicator related to a yield of the semiconductor devices manufactured from the substrates; and a charging device adapted to charge for usage of the semiconductor device manufacturing apparatus according to the measured indicator, wherein a chamber of the semiconductor device manufacturing apparatus is exhausted, wherein the indicator comprises an amount of particles discharged from the chamber of the semiconductor device manufacturing apparatus and being present in an exhaust system that exhausts an interior of the chamber when the interior of the chamber is exhausted.

* * * * *